June 3, 1941.   W. A. HESSE   2,244,620
ELECTROPLATING APPARATUS
Filed July 19, 1938   2 Sheets-Sheet 1
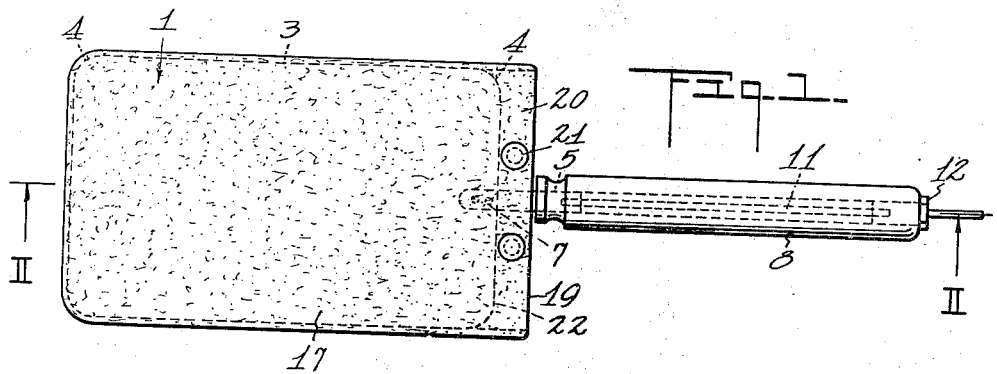
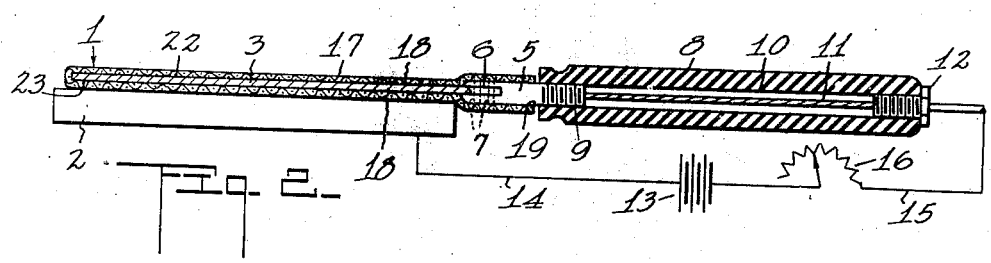
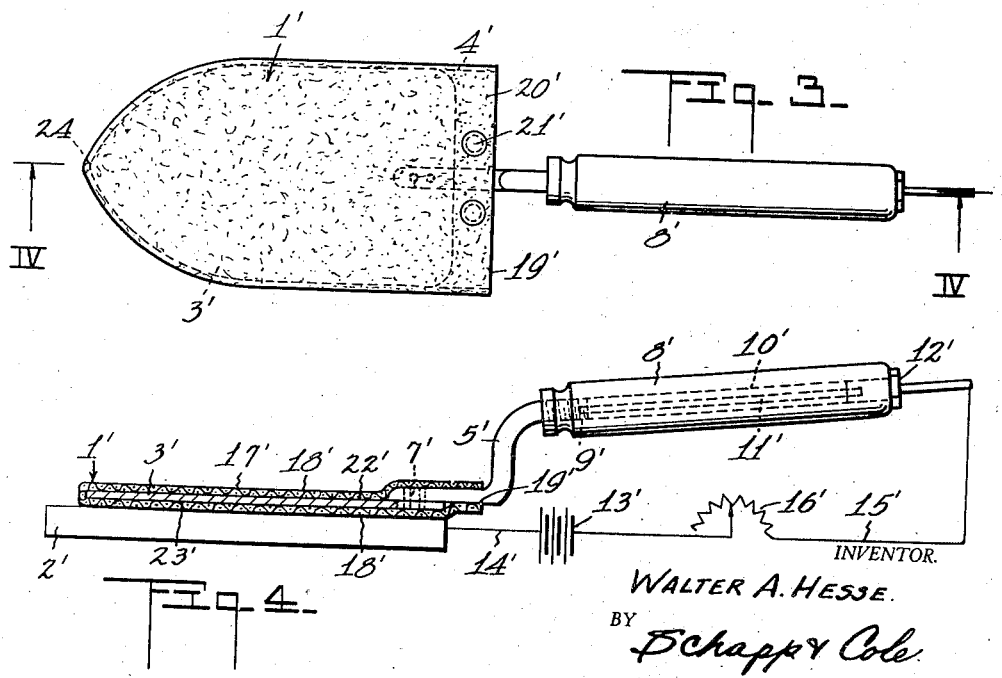
INVENTOR.
WALTER A. HESSE.
BY Schapp & Cole
ATTORNEYS.

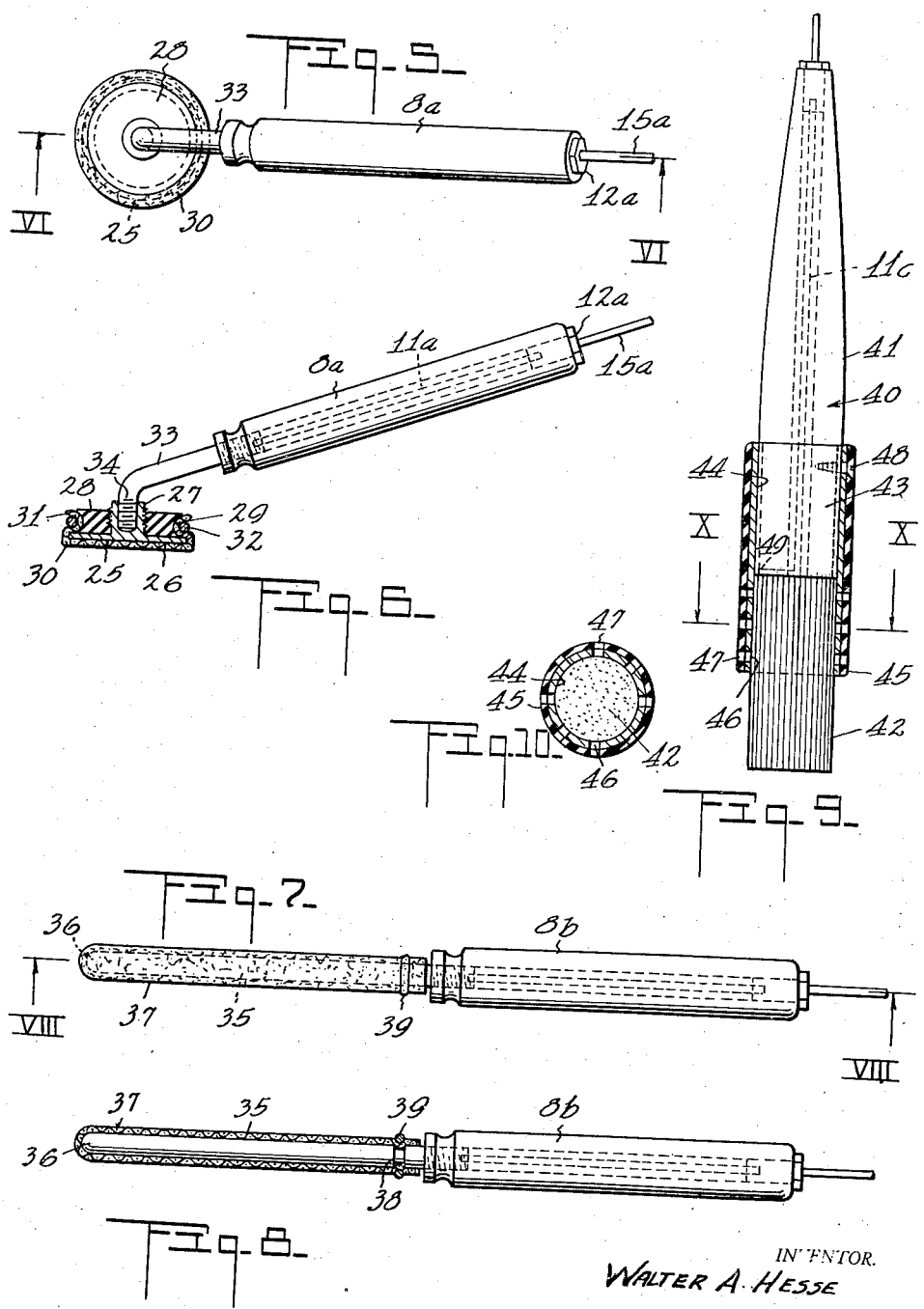

Patented June 3, 1941

2,244,620

UNITED STATES PATENT OFFICE 2,244,620

ELECTROPLATING APPARATUS

Walter A. Hesse, Alameda, Calif.

Application July 19, 1938, Serial No. 220,023

1 Claim. (Cl. 204—224)

The present invention relates to improvements in electroplating apparatus, which also may be used for electrocleaning, and has particular reference to electrodes for use therewith.

The present application is a continuation in part of application, Serial Number 135,429, since issued into Patent No. 2,215,102.

One of the problems encountered in the field of generation, transmission and distribution of electrical energy is the difficulty of eliminating oxidation of conducting surfaces and contacts of oil switches, disconnect switches, pole top switches, bus bar clamps and connectors, relay and compensator contacts, tap changing transformer and breaker contacts, cable ends and clamps, etc. This oxidation results in increased resistance to the passage of the current and induces the tendency to temperature increase and consequent trouble and loss of power.

This invention has as one of its objects the provision of a small portable electroplating and electrocleaning apparatus that is easily brought to the object to be plated, thus entirely eliminating the expensive and bulky tanks containing gallons of plating solution, as well as the expert attention required to maintain the solutions in proper working condition.

The apparatus which is made in accordance with the invention may be used to eliminate and prevent further oxidation of the foregoing conducting surfaces.

It will be understood, of course, that my apparatus is also intended for electroplating and electrocleaning various other objects, such as automobile radiator shells, headlights and the like, and I do not wish to be limited in this respect.

When using the apparatus disclosed in this invention it is unnecessary to remove the object from its mounting and place it in a plating bath, which, in most cases, cannot be done except at added expense, inconvenience and loss of time.

It is further proposed to provide plating anodes of various sizes and shapes, which may be closely applied to the object being plated, causing the molecules of the anode to be driven into the base metal and producing great adhesion.

A further object of the invention is the provision of electrodes that are designed for electroplating or electrocleaning parts that are difficult of access and at the same time the plating or cleaning can be readily accomplished.

Other objects and advantages will appear as the specification proceeds and the novel features will be set forth in the claim hereto annexed.

For a better understanding of my invention, reference should be had to the accompanying drawings, forming part of this application, wherein several embodiments are shown.

Figure 1 is a top plan view of one form of electrode;

Figure 2 a vertical section taken along line II—II of Figure 1 and further disclosing the wiring diagram;

Figure 3 a top plan view of a modified form of electrode;

Figure 4 a vertical section along line IV—IV of Figure 3, parts being shown in elevation and the wiring diagram illustrated;

Figure 5 a top plan view of a still further modification of electrode;

Figure 6 a vertical section taken along line VI—VI of Figure 5, with parts in elevation;

Figure 7 a top plan view of another form of electrode;

Figure 8 a vertical section taken along line VIII—VIII of Figure 7;

Figure 9 a vertical section through a brush type electrode, the brush proper being shown in elevation; and Figure 10 a transverse sectional view along the line X—X of Figure 9.

While I have shown only the preferred forms of my invention, it should be made clear that various changes or modifications may be made within the scope of the appended claim without departing from the spirit of the invention.

Referring now to Figures 1 and 2, it will be noted that I provide an electrode indicated generally at 1, which may be used, for instance, in electroplating an object 2, or for electrocleaning the latter. In its structural features the electrode has a broad, flat, blade-like plate 3 of substantially rectangular outline, the corners thereof being rounded as at 4.

The plate 3 may be made of any suitable material and conforms to the metal that is to be deposited on the object being plated. For instance, if silver plating is desired, the plate will be made of silver. The plate is substantially rigid, but may yield slightly in response to uneven surface of the object being treated.

In details of construction the blade has a stub shaft or shank 5 secured thereto. The shaft has been illustrated as being bifurcated as at 6 so as to straddle one end of the blade. Rivets or other suitable fastening means 7 may be used to anchor the stub shaft to the blade. A handle 8 of insulating material is threaded upon the projecting end of the stub shaft at 9 and provides means by which the plater can move the blade over the object during the plating or cleaning operation.

The handle 8 has a bore 10 extending axially therethrough for accommodating an electrical conductor 11. One end of this conductor is fastened to the shaft 9, while the other end is connected to a fitting 12. The latter is threaded into the bore 10.

In electroplating the object 2 the latter is connected to the negative side of a battery 13 or other source of suitable current or electrical energy by an insulated wire 14. The positive side of the battery, current rectifier or the like, is connected by an insulated wire 15 to the fitting 12. The latter in turn is attached to the conductor 11. If desired, a rheostat 16 may be introduced into the electrical circuit.

The object being plated in reality becomes the cathode during plating thereof and the plate 3 the anode. The metal of the anode is gradually transferred to the surface of the object as the plating continues.

An envelope 17 of porous and absorbent material, such as flannel or felt, is used to incase the plate 3 and is adapted to be saturated with a suitable electrolyte. This envelope has two confronting walls 18 that are secured together along three edges. The end 19 of the envelope is left open to allow the plate 3 to be introduced into the envelope.

The envelope 17 conforms substantially to the outline of the plate 3, but extends slightly beyond the latter as at 20. After the plate has been inserted into the envelope, the marginal sections along the open end of the envelope are secured together by snap fasteners 21 or other suitable fastening means. These snap fasteners may be of conventional construction, and have been illustrated as being disposed on opposite sides of the shaft 5 and adjacent the latter. The fasteners coact with the end 22 of the plate 3 in holding the plate within the envelope.

The blade 3 has two flat opposed working faces 22 and 23, both of which are covered by the envelope 17. As the envelope is moved over the surface of the object being plated the latter will be burnshed. When the lower surface of the envelope is in contact with the object being plated the upper part of the envelope acts as a reservoir for holding additional electrolyte, which gradually drains to the lowermost part of the envelope.

It is important that the surface of the object be free from oil, grease and other fouling substances before proceeding with the plating. If the plater so desires, the old plating may be removed by reversing the direction of current flow in the electrical circuit, that is, the object is made to become the anode and the plate 3 the cathode. This may be accomplished by changing the wires 14 and 15 to the opposite sides of the battery from that illustrated in the drawings.

The envelope 17 prevents the plate 3 from contacting with the object during the plating or cleaning. Such direct contact would result in short-circuit, causing excessive flow of current and burning of the object on its surface.

Reference is now made to Figures 3 and 4. The blade 3' therein shown is tapered along the opposite edges thereof so as to come to a point at 24 opposite the handle 8'. The envelope 17' is correspondingly shaped. In this form, however, the shaft 5' is bent in the manner shown in Figure 4 so as to present the handle 8' in offset relation relative to the plane of the blade 3'. In all other respects the construction and operation of the electrode shown in Figures 3 and 4 is the same as the form first described in Figures 1 and 2. Like numbers will therefore be applied to corresponding parts, except the numbers will be primed (') in Figures 3 and 4.

In Figures 5 and 6 I show a further modification of my electrode, in which a disc-like member 25 is used. This disc has a flat lower working face 26 on one side thereof and a projection 27 rising centrally from its opposite side. A washer 28 of insulation is threaded upon the projection in the manner illustrated.

The washer is formed with an annular groove 29 therein, and it will be noted that the rim of the disc extends slightly beyond the rim of the washer. A piece of absorbent material 30 is arranged over the working surface 26 and is adapted to be saturated with a suitable electrolyte. The marginal section 31 of this material is drawn up over the rim of the disc and is removably secured in the groove 29 by an elastic band 32 or other fastening means.

A shank 33 is threaded into the projection at 34 and also into a handle 8a. The shank is bent so that the handle will extend at an angle relative to the working surface 26. In this form the shank 33 may be connected to the positive side of a source of electrical energy by a conductor 11a, a fitting 12a and the insulated wire 15a when it is desired to use the disc 25 as an anode for electroplating. In the case of electrocleaning, however, the disc is connected to the negative side of the source of electrical energy. The operation is the same as in the first two forms described hereinbefore.

The electrolytic apparatus shown in Figures 7 and 8 makes use of a rod-like electrode 35, which is substantially uniform throughout the length thereof. The end 36 of the electrode is rounded and the electrode is incased in an envelope 37 that snugly surrounds the electrode. A handle 8b is fastened to one end of the electrode and the latter is fashioned with a circumferential groove 38 adjacent the handle. An elastic band 39 or the like coacts with the groove in securing the envelope to the electrode.

The electrical circuit in this form will be the same as in the forms previously described in detail and it need not be repeated here.

Figures 9 and 10 illustrate a brush 40 having a handle 41 and bristles 42 fastened thereto by suitable means, including a metallic ferrule 43. A tubular electrode 44 encloses the upper part of the bristles, while the lower ends of the bristles are left free to flex. A sleeve 45 of insulation material surrounds the electrode and corresponds in length therewith.

The electrode and the sleeve have registering openings 46 and 47, respectively. A screw 48 has been shown for securing both the electrode and the sleeve to the brush handle. It will be noted that the screw insures registry of the openings 46 and 47.

The bristles 42 are adapted to be dipped into a suitable electrolyte and the latter may enter also through the openings 46 and 47 to saturate the upper part of the bristles around the electrode. The electrolysis in the brush often creates gas in the brush and the openings 46 and 47 serve as ports through which this gas may be liberated so that the gas will not tend to displace the electrolyte from around the electrode.

In this brush-type apparatus, the electrical conductor 11c is connected at 49 to the metal ferrule 43, the latter in turn being in electrical connection with the electrode 44. The insulated sleeve 45 is dimensioned to telescope over the electrode 44 and the latter in turn is made to fit over the ferrule 43, thus facilitating the assembly of the apparatus.

I wish to point out that the apparatus shown in Figures 1 and 2 (as well as Figures 3 and 4) was designed to facilitate deposition of silver (or other metals) between the inner adjacent surfaces of double bladed jaws of disconnect switches or other objects where there is insufficient room to permit the use of any of the other forms of apparatus herein described.

I claim:

In an electrolytic apparatus, an electrode comprising a single, flat blade having parallel side edges and a straight transverse rear edge, means for connecting the electrode to a source of electrical energy, an envelope of absorbing material having confronting walls lying flat against the faces of the electrode and having overlapping side margins secured together to form a snug fitting bag around the electrode, with an opening in the rear coextensive with the width of the electrode, the electrode being insertible through the said open rear end, the envelope being of sufficient length to present flat marginal end sections disposed beyond the rear end of the encased electrode and substantially in the plane thereof, and being adapted to be saturated with an electrolyte, a rigid handle extending from the rear of the electrode through said open end whereby the electrode may be manipulated, and snap fasteners disposed in the flat marginal end sections of the envelope on opposite sides of the handle and adjacent thereto for detachably securing said marginal rear sections of the envelope together at the open end thereof to normally retain the electrode against withdrawal from the envelope, the said rear sections of the envelope forming a smooth and flat overlap area lying substantially in the plane of the electrode.

WALTER A. HESSE.